United States Patent
Brevick et al.

(10) Patent No.: US 8,965,628 B2
(45) Date of Patent: Feb. 24, 2015

(54) POWERTRAIN THERMAL MANAGEMENT SYSTEM FOR A DRY-CLUTCH TRANSMISSION

(75) Inventors: John Edward Brevick, Livonia, MI (US); Thomas G. Leone, Ypsilanti, MI (US); Steven Anatole Frait, Milan, MI (US); Norman Jerry Bird, Plymouth, MI (US); James Thomas Gooden, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 12/946,939

(22) Filed: Nov. 16, 2010

(65) Prior Publication Data

US 2012/0123635 A1    May 17, 2012

(51) Int. Cl.
*G06F 19/00* (2011.01)
*F02M 31/04* (2006.01)
*F01P 1/06* (2006.01)

(52) U.S. Cl.
CPC *F02M 31/04* (2013.01); *F01P 1/06* (2013.01); *F01P 2025/04* (2013.01); *F01P 2025/42* (2013.01); *F01P 2060/045* (2013.01); *Y02T 10/126* (2013.01)
USPC ........................................ 701/36; 123/184.55

(58) Field of Classification Search
CPC ........................................................ F16D 13/72
USPC ............ 701/36, 108, 103, 113, 22; 192/30 R, 192/48.8, 111.12, 113.2, 113.3, 113.26; 74/336.5, 364, 606 R; 123/327, 538, 123/568.18, 568.21, 568.27, 41.31, 41.33, 123/556, 436, 184.55, 568.29; 477/61, 70, 477/100, 102, 110, 111, 109; 180/54.1, 180/302; 310/105; 60/39.181
See application file for complete search history.

(56) References Cited

U.S. PATENT DOCUMENTS

| | | | |
|---|---|---|---|
| 1,024,737 A | | 4/1912 | Miller |
| 2,019,146 A | * | 10/1935 | Livermore ...................... 74/364 |
| 2,107,954 A | * | 2/1938 | Morton et al. ........... 192/113.26 |
| 2,198,792 A | | 4/1940 | Schjolin |
| 2,205,629 A | | 6/1940 | Peterson |
| RE22,267 E | * | 2/1943 | Aspinwall et al. ........... 74/336.5 |
| 2,310,203 A | | 2/1943 | Banker |
| 2,777,965 A | * | 1/1957 | Winther ........................ 310/105 |
| 3,007,561 A | | 11/1961 | Harting |
| 3,171,527 A | | 3/1965 | Ott |
| 3,251,437 A | | 5/1966 | Moyer et al. |
| 3,335,834 A | | 8/1967 | Horst-Egon Wach |
| 3,542,004 A | * | 11/1970 | Cornelius ................ 123/568.29 |

(Continued)

FOREIGN PATENT DOCUMENTS

| | | | | |
|---|---|---|---|---|
| CN | 1920318 | | 9/2006 | |
| GB | 2058911 A | * | 4/1981 | .............. B60T 1/093 |

(Continued)

*Primary Examiner* — Helal A Algahaim
*Assistant Examiner* — Yuri Kan
(74) *Attorney, Agent, or Firm* — James Dottavio; MacMillan, Sobanski & Todd, LLC

(57) ABSTRACT

The present disclosure relates to systems and methods for controlling a flow regulator, such as a diverter valve, that is configured to guide air through a transmission housing before entering an engine intake manifold. In certain arrangements, the flow regulator operates according to predetermined conditions, e.g., meeting an engine intake manifold air temperature threshold.

17 Claims, 3 Drawing Sheets

(56) References Cited

U.S. PATENT DOCUMENTS

| | | | |
|---|---|---|---|
| 3,661,238 A | | 5/1972 | Davies |
| 3,664,467 A | | 5/1972 | Lucien et al. |
| 4,020,937 A | | 5/1977 | Winter |
| 4,073,202 A | * | 2/1978 | Aoyama et al. ............... 477/100 |
| 4,148,230 A | * | 4/1979 | Kodama et al. ............... 477/110 |
| 4,165,722 A | * | 8/1979 | Aoyama ...................... 477/111 |
| 4,174,027 A | * | 11/1979 | Nakazumi .................... 477/181 |
| 4,186,702 A | * | 2/1980 | Day et al. .................. 123/568.27 |
| 4,192,264 A | | 3/1980 | Arnaud ....................... 123/568.27 |
| 4,214,562 A | * | 7/1980 | Mowbray ................. 123/568.18 |
| 4,294,343 A | | 10/1981 | Reh |
| 4,382,497 A | | 5/1983 | Sakai et al. |
| 4,424,667 A | * | 1/1984 | Fanning ...................... 60/39.181 |
| 4,467,673 A | * | 8/1984 | Hamada et al. ................. 477/61 |
| 4,561,522 A | | 12/1985 | Dayen |
| 4,657,128 A | | 4/1987 | Fujito et al. |
| 4,721,195 A | | 1/1988 | Majima |
| 4,846,315 A | | 7/1989 | Dayen |
| 4,923,043 A | | 5/1990 | Okuno |
| 5,048,372 A | * | 9/1991 | Sodeno et al. ................. 477/102 |
| 5,072,816 A | | 12/1991 | Takeuchi et al. |
| 5,186,080 A | * | 2/1993 | Simon et al. ................... 477/109 |
| 5,638,932 A | | 6/1997 | Mizukami |
| 5,722,524 A | | 3/1998 | Mizukami et al. |
| 5,732,808 A | | 3/1998 | Viola et al. |
| 5,845,757 A | | 12/1998 | Csonka |
| 5,857,547 A | | 1/1999 | Dequesnes |
| 5,904,234 A | | 5/1999 | Kosumi et al. |
| 5,996,757 A | | 12/1999 | Hofmann et al. |
| 6,029,624 A | * | 2/2000 | Beechie et al. ............... 123/327 |
| 6,044,924 A | * | 4/2000 | Adli .............................. 180/302 |
| 6,129,191 A | | 10/2000 | Kummer et al. |
| 6,145,633 A | | 11/2000 | Niederstadt et al. |
| 6,151,766 A | | 11/2000 | Everett |
| 6,279,709 B1 | | 8/2001 | Orlamunder |
| 6,293,370 B1 | | 9/2001 | McCann et al. |
| 6,352,147 B1 | | 3/2002 | Orlamunder et al. |
| 6,520,136 B2 | | 2/2003 | Ito et al. |
| 6,568,518 B2 | | 5/2003 | Sarar |
| 6,695,743 B2 | | 2/2004 | Tanaka et al. |
| 6,745,884 B2 | | 6/2004 | Hick et al. |
| 6,823,975 B2 | | 11/2004 | Martin |
| 7,063,196 B2 | | 6/2006 | Wakabayashi et al. |
| 7,380,645 B1 | | 6/2008 | Ruiz |
| 7,805,235 B2 | * | 9/2010 | Sujan et al. .................. 701/103 |
| 2001/0025759 A1 | * | 10/2001 | Sarar ............................ 192/48.8 |
| 2003/0114978 A1 | * | 6/2003 | Rimnac et al. ............... 701/108 |
| 2005/0126877 A1 | * | 6/2005 | Schneider et al. ......... 192/113.2 |
| 2006/0196483 A1 | * | 9/2006 | Magyari ...................... 123/538 |
| 2007/0186892 A1 | * | 8/2007 | Kishi et al. ............... 123/184.55 |
| 2009/0000577 A1 | | 1/2009 | Miyagawa |
| 2009/0101312 A1 | | 4/2009 | Gooden et al. |
| 2009/0250042 A1 | * | 10/2009 | Sujan et al. ............... 123/568.21 |
| 2009/0314591 A1 | | 12/2009 | Suppiah |
| 2010/0113216 A1 | | 5/2010 | Avny et al. |
| 2010/0190604 A1 | * | 7/2010 | Lawson, Jr. .................... 477/70 |
| 2011/0024258 A1 | * | 2/2011 | Avny et al. ................. 192/111.12 |
| 2011/0100779 A1 | * | 5/2011 | Wheals ....................... 192/113.3 |
| 2011/0226538 A1 | * | 9/2011 | Brady et al. ................. 180/54.1 |
| 2011/0247454 A1 | * | 10/2011 | Prior ............................ 74/606 R |
| 2011/0251743 A1 | * | 10/2011 | Hu et al. ....................... 701/22 |
| 2012/0010802 A1 | * | 1/2012 | Ma et al. ..................... 701/113 |
| 2012/0031373 A1 | * | 2/2012 | Brennan ...................... 123/436 |
| 2012/0080287 A1 | * | 4/2012 | Brevick ..................... 192/30 R |
| 2012/0123635 A1 | * | 5/2012 | Brevick et al. ................. 701/36 |

FOREIGN PATENT DOCUMENTS

| | | | |
|---|---|---|---|
| GB | 2097873 | | 11/1982 |
| GB | 2097873 A | * | 11/1982 ............. F16D 13/72 |
| JP | 61235219 | | 10/1986 |
| JP | 03189419 | | 8/1991 |
| JP | 04029622 | | 1/1992 |
| JP | 05106642 | | 4/1993 |
| JP | 07310755 | | 11/1995 |
| JP | 11254981 | | 9/1999 |
| JP | 2002364362 | | 12/2002 |
| JP | 2004360460 | | 12/2004 |
| JP | 2005003134 | | 2/2005 |
| JP | 2006283872 | | 10/2006 |

\* cited by examiner

POWERTRAIN THERMAL MANAGEMENT SYSTEM FOR A DRY-CLUTCH TRANSMISSION

TECHNICAL FIELD

The present disclosure relates to thermal management strategies for a vehicle powertrain having a dry-clutch transmission.

BACKGROUND

Conventional vehicle transmissions predominantly employ wet clutches to accomplish gear shifting. Transmissions typically include a transmission fluid which is recycled throughout the transmission. Wet clutches generally provide greater heat transfer and temperature control than dry-clutches. Wet clutches also, however, have a lower coefficient of friction than dry-clutches.

Dry-clutches tend to provide higher coefficients of friction than wet clutches. Dry-clutches can provide lower costs and complexity. Still, dry-clutches can have thermal management issues. For example, dry-clutches can reach higher temperatures in repeat vehicle launch events with heavy vehicle load and road grade conditions. Some dry-clutch transmissions are designed to exhaust cooling air from the transmission housing or recycle the air. This can result in energy wasted since other components of the powertrain can benefit from heated transmission air.

One patent publication teaches a system having a closed-loop energy cycle. U.S. Patent Publication No. 2010/0189839 titled "System and Method for the Co-Generation on Fuel Having a Closed-Loop Energy Cycle" teaches the use of heat exchangers that provide heat to a Wankel engine in order to generate electricity. While this publication teaches general energy conservation techniques within a vehicle powertrain it fails to teach conservation of heat energy for intake control in an internal combustion engine.

Therefore, it is desirable to have a powertrain with dry-clutch transmission having heat conservation techniques that can be used to enhance engine performance.

SUMMARY

The present invention may address one or more of the above-mentioned issues. Other features and/or advantages may become apparent from the description which follows.

Certain embodiments of the present invention relate to a method of controlling a powertrain thermal management system, including: controlling a diverter valve, configured to guide air through a transmission housing before entering an engine intake manifold, according to a predetermined condition.

Another embodiment of the present invention relates to a powertrain thermal management system, including: an engine inlet; a transmission housing in fluid communication with the engine inlet so that air can be cycled through the housing; and a diverter valve configured to route air through the transmission housing before routing it to the intake manifold.

Another embodiment of the present invention relates to a powertrain thermal management system, including: an engine inlet configured to at least partially guide air through a transmission housing; a valve configured to control the distribution of air to the transmission housing and an intake manifold; and a flow regulator configured to control the distribution of air to the intake manifold from the transmission housing.

Yet another embodiment of the present invention relates to a control circuit for a powertrain thermal management system, comprising: a transmission clutch air temperature sensor; an engine manifold air temperature sensor; an actuator configured to control a diverter valve that apportions air between a transmission housing and an engine intake manifold; and a powertrain control unit configured to control the actuator according to a predetermined condition.

The present teachings provide a lower cost and complexity than a wet clutch or an external fan cooled dry-clutch.

Another advantage of the present teachings is that they provide increased clutch cooling by guiding air through the clutch housing. In guiding air through the transmission clutch and to the engine intake manifold odor is eliminated, the operating temperature for the dry-clutch transmission is reduced and drive cycle engine efficiency is improved.

Another advantage of the present teachings is that they can improve vehicle fuel efficiency by reducing engine throttle losses.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description for carrying out the invention when taken in connection with the accompanying drawings. In the figures:

Figure 1:
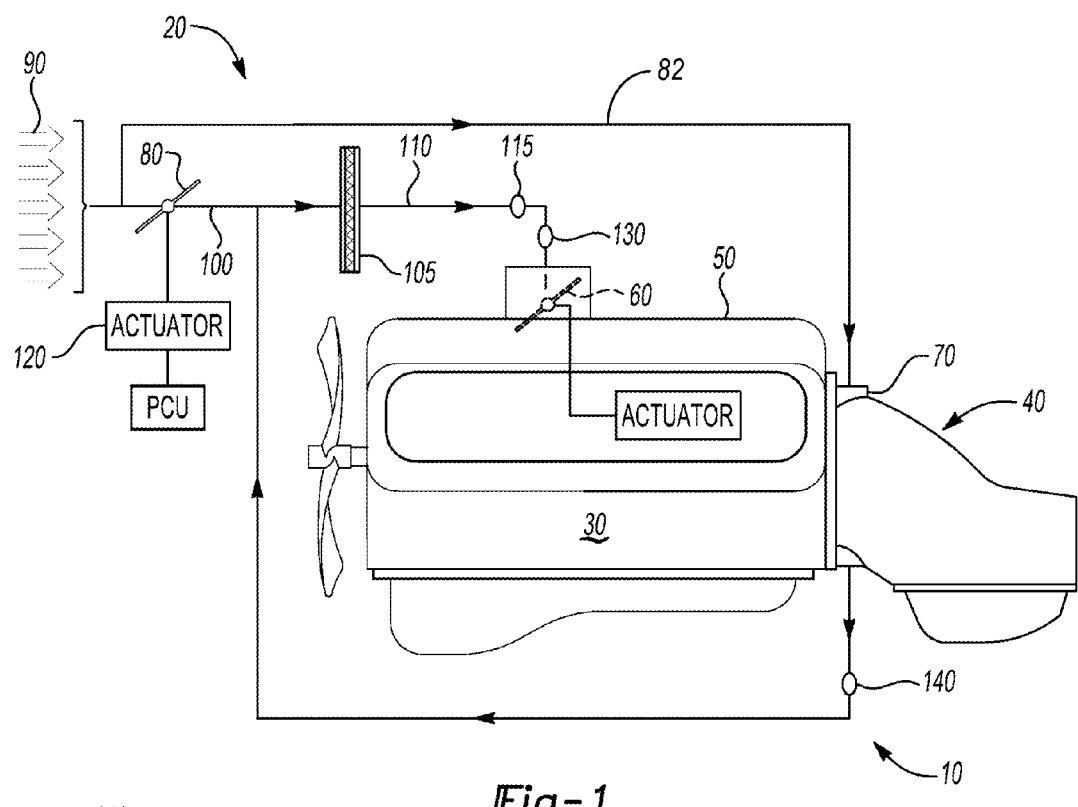
FIG. 1 is a schematic depiction of a powertrain with thermal management system.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, wherein like characters represent the same or corresponding parts throughout the several views there are shown exemplary powertrain thermal management systems. The thermal management systems conserve heat exhausted from the transmission. Heat is transferred from a dry-clutch transmission to an engine intake manifold. In some embodiments a diverter valve is incorporated into the engine inlet to control the amount of air cycled from the engine inlet through the transmission. In some embodiments, multiple flow regulators are incorporated in the powertrain to control airflow between the transmission and engine intake manifold. Flow regulators include, for example, diverter valves or fixed/variable orifices.

The present teachings are compatible with any type of single or multiple dry-clutch transmission. For example, the thermal management systems can be implemented in multiple speed transmissions including five, six, seven and eight speed transmissions. Moreover, an electrically variable, continuously variable, automatic or manual transmission can incorporate the present teachings. Any type of internal combustion engine can be used with the thermal management systems including inline or v-type, diesel, Otto cycle, boosted or non-boosted engines. Hybrid powertrains are also compatible with the present teachings.

Referring now to FIG. 1, there is shown therein a schematic depiction of a powertrain 10 with thermal management system 20. The powertrain 10 includes an internal combustion engine 30 and transmission 40. The engine 30 is a v-type engine (e.g., a V6). The engine 30 includes an intake manifold 50 in an upper portion of the engine. A throttle 60 (or valve) controls the distribution of air into the intake manifold 50. An accelerator pedal sends a signal to a powertrain control unit (or "PCU") to govern throttle position. In the illustrated embodiment, the throttle 60 is controlled to maintain some vacuum reserve with the assistance of a diverter valve. The vacuum reserve is utilized for power brakes, for purging the fuel vapor from a charcoal canister, for controlling positive crankcase ventilation flow, for controlling transient torque response, and to avoid excessive induction noise.

The transmission 40 is a dual dry-clutch transmission. Air is selectively guided from an engine inlet through a portion of the transmission housing 70. In this embodiment, air is cycled through the portion of the transmission housing 70 that encases an input clutch or clutches. In other embodiments, air is cycled through other portions of the transmission, e.g., from the input clutch to the output shaft or vice versa.

The thermal management system 20, shown in FIG. 1, includes the diverter valve 80 configured to route air through a bypass passage (channel) 82 and the transmission housing 70 before routing it to the intake manifold 50. Transmission housing 70 is in fluid communication with an engine inlet 90. Air from the inlet path cools the transmission 40. Diverter valve 80 is positioned in an intermediate passage 100, a channel between the engine inlet 90 and intake manifold 50. Throttle 60 is included in the powertrain and controls the amount of air cycled through the engine 30. An air filter 105 is included in line 110 to filter air passed through to the manifold 50.

Diverter valve 80 is controlled by an actuator 120. Diverter valve 80 can be a digital (on/off) or analog (continuously controlled) control valve. Actuator 120 is controlled by and in communication with the PCU. The PCU is configured to execute a method of controlling a powertrain thermal management system such as the methods discussed herein below. When diverter valve is in the open position air is divided between the transmission 40 and engine intake manifold 50. When diverter valve 80 is in a closed position the air entering the engine inlet 90 is completely routed through the transmission before entering the engine intake manifold 50.

The system shown in FIG. 1 includes a mass airflow sensor 115 is included in line 110 after air filter 105. Sensor 115 is configured to determine the amount of air guided into the intake manifold 50. Sensor 130 is a temperature sensor (or thermocouple) configured to take temperature readings of air entering the engine intake manifold 50. Sensor 140 is configured to take temperature readings of air exiting the transmission housing. The PCU is configured to control diverter valve 80 position. The diverter valve 80 is opened to decrease the temperature of air drawn into the engine manifold 50. Diverter valve 80 is closed to decrease the temperature of air brought into the transmission 40 and increase the temperature of air drawn into an engine manifold 50. The PCU is configured to control the diverter valve 80 according to a control strategy (e.g., as is described with respect to FIG. 5).

In another embodiment, PCU is configured to control diverter valve 80 according to a fuel efficiency threshold or target for engine operation. Fuel efficiency is measured through engine speed (in rpms), fuel injector pulse width and an estimated engine output torque. Where a higher efficiency is desired, diverter valve is positioned closer to the closed position. A target fuel efficiency threshold for the engine is, for example, 30% efficiency. Once the fuel efficiency drops below 30% PCU closes the diverter valve.

PCU, as shown in FIG. 1, also includes an engine control unit (or ECU). PCU can control diverter valve 80 according to a number of different predetermined conditions including transmission temperature, engine intake manifold temperature and fuel efficiency, as well as according to intake manifold pressure or engine torque (as is discussed herein below). ECU is linked to a pressure sensor to take measurements of the intake manifold pressure. ECU is able to determine the torque transferred to the transmission based on engine airflow, throttle position, intake manifold pressure, cam timing, spark timing, etc. The ECU operates the main throttle to reduce airflow when less than full torque is desired. The PCU controls the diverter valve to assist in maintaining the desired engine torque.

Figure 2:
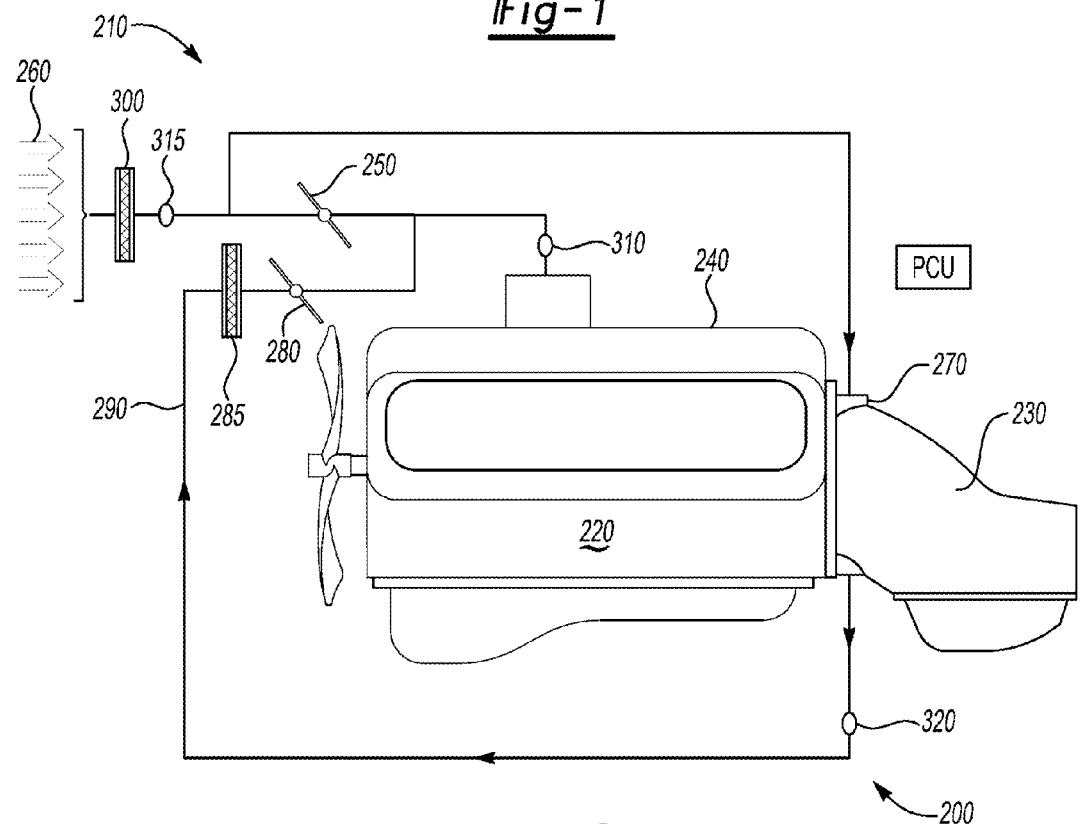
FIG. 2 is a schematic depiction of another powertrain with thermal management system.

Referring now to FIG. 2, there is shown therein a schematic depiction of another powertrain 200 with thermal management system 210. The powertrain 200 includes an internal combustion engine 220 and transmission 230. The engine 220 includes an intake manifold 240 and throttle 250 which controls the distribution of air into the intake manifold 240. The transmission 230 is a dual dry-clutch transmission. Air is guided from an engine inlet 260 through a portion of the transmission housing 270.

Diverter valve 280 is in fluid communication with a passage after or downstream of the main throttle 250. Diverter valve 280 is positioned in a bypass passage 290, a channel from the engine inlet 260, through the transmission housing 270, and to the intake manifold 240. In this manner, diverter valve 280 acts as a subsidiary control of air taken into the manifold 240. Diverter valve 280 enables full control of air flowing to the intake manifold 240, even when the engine is at or near idle. Canister vapor purge and other uses of vacuum reserve is thus maintained by controlling airflow to the intake 240 with a combination of main throttle 250 and diverter valve 280. Air is routed and heated through the transmission housing 270. Engine throttle 250, as shown in FIG. 2, is configured to control the filtered air provided to manifold 240. Throttle 250 is an electrically controlled throttle. An air filter 300 is included at inlet 260 to filter air passed through to throttle 250, transmission 230 and engine intake manifold 240. In this manner, air that passes through the transmission 230 is filtered from outside debris. Air may also be filtered through air filter 285 to prevent clutch dust from entering engine intake manifold 240.

Diverter valve 280, as shown in FIG. 2, is positioned downstream of the transmission housing 270 and the valve 280 enables further control of the amount of air passed into the manifold 240. Specifically, when throttle 250 is fully closed, diverter valve 280 is configured to regulate all air that flows to the engine. Diverter valve 280 is controlled by an actuator.

Diverter valve 280 can be a digital or analog control valve. The PCU is configured to execute a method of controlling a powertrain thermal management system as discussed herein below. In this embodiment, when diverter valve 280 is in the open position more air is provided to the engine intake manifold 240, and more cooling air is provided to transmission housing 270. When diverter valve 280 is moved towards a closed position less air is provided to the engine intake manifold 240, and less cooling air is provided to transmission housing 270.

The system 210, as shown in FIG. 2, includes sensors 310, 320 that are temperature sensors configured to take temperature readings of the air entering the engine intake manifold 240 and exiting the transmission housing 270. Sensor 315 is an airflow mass sensor that measures airflow in engine inlet 260. Sensors 310, 315, and 320 are linked to the PCU. In the embodiment shown in FIG. 2, PCU is configured to control the diverter valve 280 according to various predetermined conditions including transmission temperature, engine manifold air temperature, fuel efficiency, intake manifold pressure and engine torque.

Figure 3:
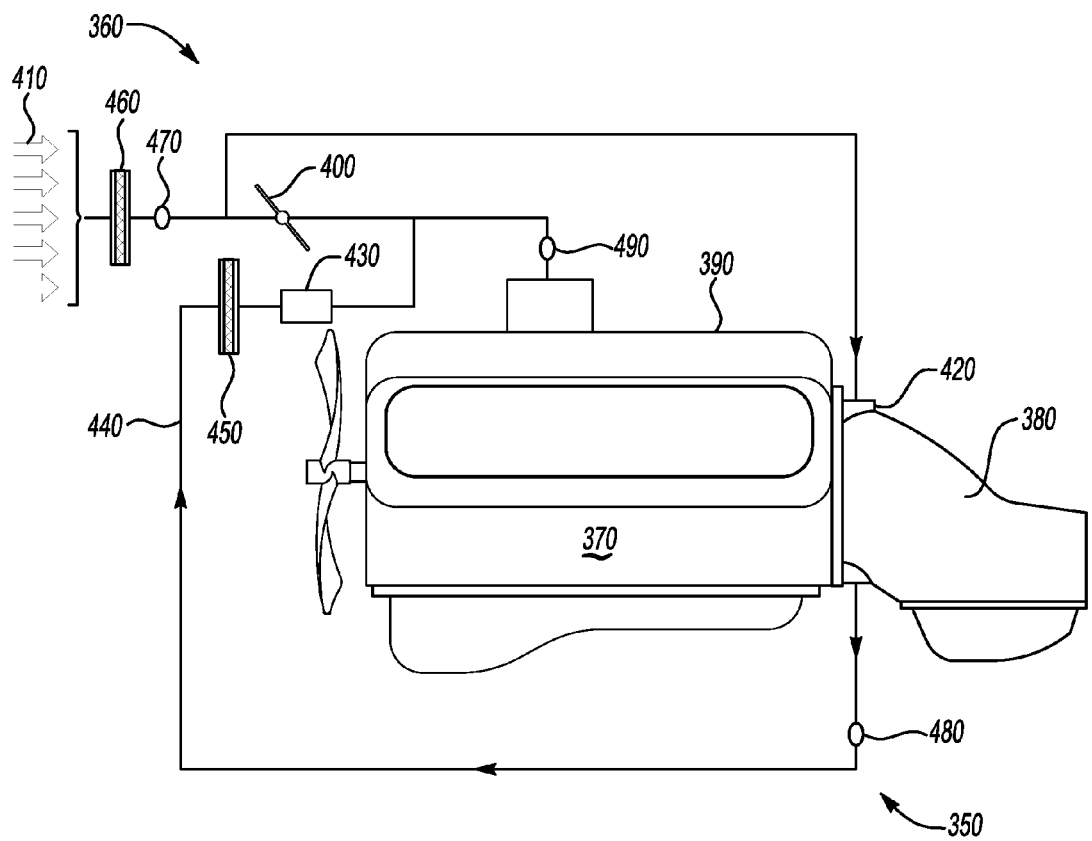
FIG. 3 is a schematic depiction of another powertrain with thermal management system.

Referring now to FIG. 3, there is shown therein a schematic depiction of another powertrain 350 with thermal management system 360. The powertrain 350 includes an internal combustion engine 370 and transmission 380. The engine 370 includes an intake manifold 390 and throttle 400 which controls the distribution of air into the intake manifold 390. The transmission 380 is a dry-clutch transmission. Air is guided from an engine inlet 410 through a portion of the transmission housing 420.

An orifice 430 is in fluid communication with a passage after or downstream of the main throttle 400. Orifice 430 is positioned in an intermediate passage 440, a channel from the engine inlet 410, through transmission housing 420, and to the intake manifold 390. In this manner, orifice 430 acts as a subsidiary control of air taken into the manifold 390. Orifice 430 prevents too much air from flowing to the intake manifold 390 when the engine is at light load. Orifice can be a fixed or an actuable variable orifice. Air filter 460 is included at the entrance of the inlet to filter air passed through to throttle 400, transmission 380 and engine intake manifold 390. Air may also be filtered through air filter 450 to prevent clutch dust from entering engine intake manifold 390.

The system 360, as shown in FIG. 3, includes sensors 490, 480 that are temperature sensors configured to take temperature readings of the air entering the engine intake manifold 390 and exiting the transmission housing 420 in passage 440. Sensor 470 is an airflow mass sensor that measures airflow through inlet 410. Sensors 470, 480 and 490 are linked to a PCU. In the embodiment shown in FIG. 3, PCU is configured to control the throttle 400 according to various predetermined conditions including transmission temperature, engine manifold air temperature, fuel efficiency, intake manifold pressure and engine torque.

Figure 4:
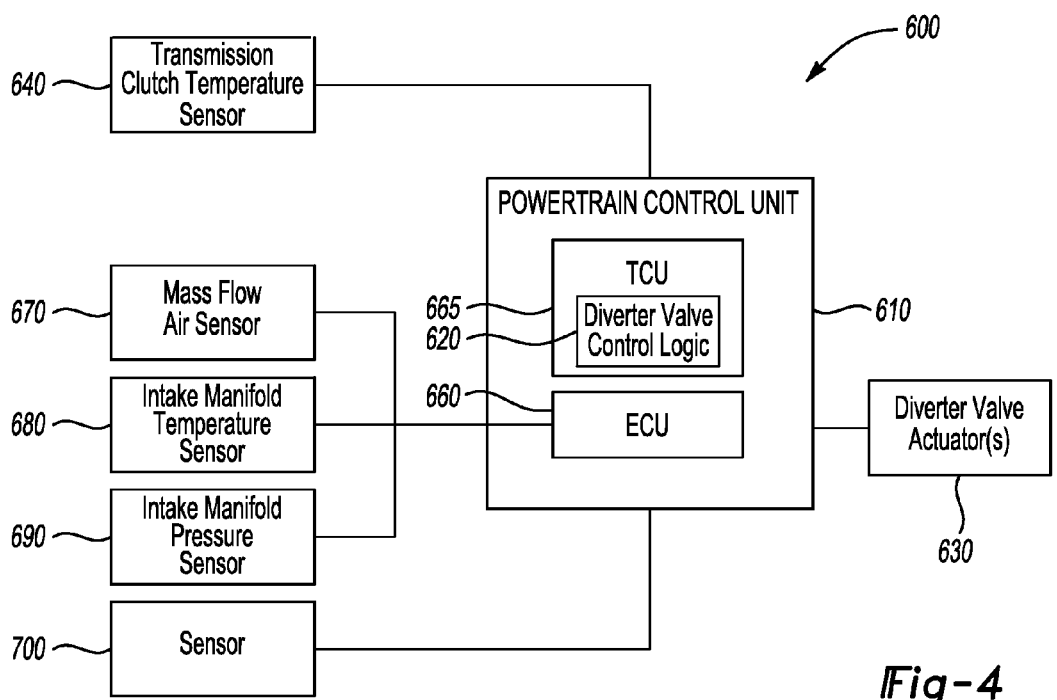
FIG. 4 is a control circuit for a powertrain thermal management system.

Now with reference to FIG. 4, there is shown therein a control circuit 600 that includes a powertrain control unit 610 with logic to execute a method of controlling a powertrain thermal management system. Control unit 610 is configured with diverter valve control logic 620 to control one or more diverter valve actuators 630 (or flow regulators) according to a predetermined condition. Diverter valve control logic 620 is incorporated in the TCU 665 in this embodiment. In FIG. 4, control unit 610 is linked to a transmission clutch air temperature sensor 640. Control unit 610 is configured to receive temperature readings from the transmission clutch air temperature sensor 640. Clutch temperature can also be derived from an algorithm having a thermal model to predict clutch temperature. A sensor sends data related to clutch air temperature, e.g., clutch slip power losses at the input clutch. Clutch temperature can be estimated from clutch slip, clutch torque, air temperature at the outlet of the transmission housing, and/or other known parameters. Control logic 620 includes predetermined high and/or low thresholds for transmission clutch temperature. When the transmission temperature falls above or below the predetermined threshold(s), diverter valve is actuated.

PCU 610, as shown in FIG. 4, is also linked to an engine control unit (or ECU) 660 and a transmission control unit (or TCU) 665. The ECU 660 collects data related to engine and powertrain operation. In this embodiment, ECU 660 is incorporated in the PCU 610. In another embodiment, ECU 660 is a separate module from the PCU. ECU 660 is configured to receive engine mass air flow readings from sensor 670, intake manifold temperature readings from sensor 680 and intake manifold pressure readings from sensor 690. ECU 660 can calculate or infer engine output torque based on these readings and/or other information such as spark advance and throttle angle. Control logic 620 includes a predetermined threshold for each parameter by which the diverter valve actuator 630 is activated. Sensor 700 is also linked to the PCU 610. Sensor 700 can be an engine knock sensor or some other sensor. Where engine knock beyond a predetermined threshold is detected, the diverter valve can be controlled to decrease the air guided through the transmission bell housing and into the engine. TCU 665 controls clutch actuation and gear selection through inputs such as engine torque, input shaft speed, output shaft speed, and accelerator pedal position. The TCU 665 estimates clutch temperature based on slip speed, clutch torque, and clutch housing output air temperature.

Figure 5:
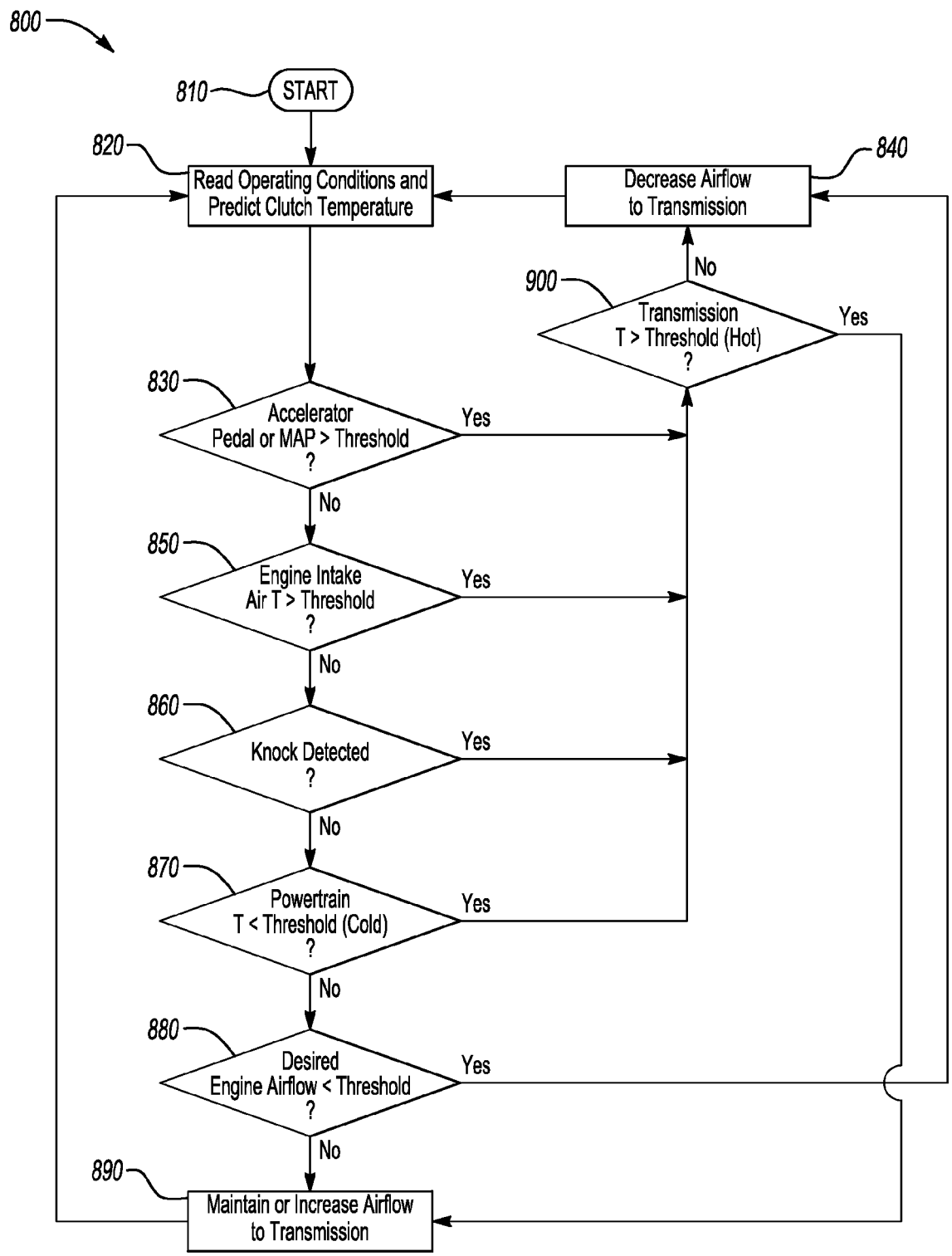
FIG. 5 is method of controlling a powertrain thermal management system.

An exemplary method 800 of a powertrain thermal management system is shown with respect to FIG. 5. FIG. 5 illustrates an algorithm 800 for controlling one or more valves or flow regulators incorporated in the engine inlet or otherwise in the vehicle to route ambient air through the transmission housing and to the engine intake manifold. The algorithm includes logic to control a diverter valve, configured to guide air through the transmission housing before entering an engine intake manifold, according to a predetermined condition. The predetermined condition can be any vehicle operating condition. The method 800 includes logic for closing or maintaining the diverter valve position to, for example, decrease the temperature of the transmission input clutch air and increase the temperature of air drawn into an engine manifold. In other embodiments of the method, the algorithm prioritizes vehicle operating conditions according to system performance demands. In those instances, some vehicle conditions have primacy over other conditions. For example, if the throttle position is 100% (or "wide open"), if the transmission clutch air temperature is in excess of a predetermined threshold the diverter valve may not be controlled to decrease air flowing through the transmission. Air flow to the engine manifold may take precedence in some conditions but not others.

Referring now to the method 800 shown in FIG. 5, the method starts at step 810. Operating conditions are accepted into the program at step 820. Operating conditions can include accelerator pedal position, engine intake manifold absolute pressure (or "MAP"), engine air intake temperature, engine knock readings, transmission housing air outlet temperature, or engine airflow. Some operating conditions can be calculated, "predicted" or estimated at step 820, for example clutch temperature may be calculated from transmission housing air outlet temperature, clutch slip, and clutch torque.

At step 830 the control unit accepts a signal indicative of accelerator pedal position or intake manifold pressure. The signal can be generated from the accelerator pedal position, MAP sensor, throttle position sensor, engine mass airflow, or combinations of these and/or other signals. If the accelerator pedal position or manifold pressure does not exceed a predetermined threshold, e.g., 90 kPa (or some other value needed for power brakes, charcoal canister purge, crankcase ventilation flow, transient torque response, induction noise, etc.), the algorithm continues to step 850. MAP readings and/or accelerator pedal position can also be indicative of a desired engine torque. An exemplary accelerator pedal position threshold is 90% of capacity. If the accelerator pedal position does not exceed 90% of capacity the algorithm continues to step 850. If the manifold pressure or accelerator pedal position is greater than the predetermined threshold, the algorithm continues to step 900, as is described later.

At step 850 the system compares engine intake air temperature to a predetermined threshold. If the intake air temperature is greater than the predetermined threshold the algorithm continues to step 900. If the intake air temperature is less than the predetermined threshold, e.g., 120 degrees Celsius, the algorithm continues to the next system check at step 860.

The algorithm also conditions diverter valve control on engine knock measured from a knock sensor. At step 860, as shown in FIG. 5, if the system detects engine knock beyond a predetermined threshold (e.g., greater than an 8% torque reduction) the diverter valve can be moved to a position to decrease airflow to the transmission, which would result in cooler air to the engine intake manifold and reduced knock tendency. In some embodiments, the algorithm may control airflow based on the severity of knock or the amount of spark retard due to knock. Also in some embodiments, engine knock can be inferred from engine operating conditions. In other embodiments, spark retard queues diverter valve control. If spark retard is in excess of a predetermined threshold (e.g., greater than an 8% torque reduction) diverter valve is controlled to decrease airflow to the transmission. If no significant knock or spark retard is detected, the algorithm continues to step 870.

At step 870, the system compares the powertrain temperature to a predetermined threshold. If the ambient and powertrain temperature is less than a predetermined threshold (cold), it can be desired to avoid degrading cabin heating and window defrost performance, so the algorithm continues to step 900. An exemplary cold threshold is less than −12° C. The logic continues to step 880 if the clutch temperature is higher than a predetermined (hot) threshold. The predetermined (hot) threshold is an upper limit for the clutch temperature. If the clutch temperature exceeds the predetermined (hot) threshold, the algorithm does not continue to step 840—decreasing airflow to the transmission. In this manner, step 900 acts as an override of other instruction, ensuring that the transmission is not overheated. At step 880 the measured engine airflow is compared to a predetermined threshold. The threshold may be the current airflow, or the current airflow plus a safety margin. If the desired engine airflow is too low, the amount of air guided to the transmission is decreased at step 840. In one embodiment, the airflow threshold is greater than 8% error from expected airflow.

If all of the system checks are satisfactory, the diverter valve position is controlled to maintain or increase airflow to the transmission, at step 890. If one of the system checks led to step 900, then the clutch temperature is compared to a hot threshold. If the clutch is not too hot, the algorithm continues to step 840 where airflow to the transmission is decreased. If the clutch is too hot at step 900, then the need to prevent clutch over-heating may over-ride one or more of the system checks in steps 830 through 870, and the algorithm continues to step 890 where airflow to the transmission is maintained or increased. An exemplary clutch temperature threshold is 250° C.

Other operating conditions can be incorporated into the algorithm. For example, in another embodiment, the algorithm accepts data related to fuel efficiency from the ECU. If the engine fuel efficiency is less than the threshold, the diverter valve can be controlled to change air flow to the transmission. In another embodiment, the algorithm includes system fault logic configured to detect any number of system failure modes and control diverter valve accordingly. The algorithm 800 is a closed loop system and returns to retrieving data related to vehicle operating conditions at step 820.

Algorithm can be programmed into a PCU, ECU and/or TCU. Sensors can be hardwired or wirelessly linked to the control unit to input relevant data. Vehicle conditions are stored in controller memory such as random access memory (RAM) or keep alive memory (KAM). Diverter valve control logic can be stored in read only memory (ROM).

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

Those familiar with the art to which this invention relates will recognize various alternative designs and embodiments for practicing the invention within the scope of the appended claims. In particular, the type and location (if any) of air meters, air filters, temperature sensors, pressure sensors, etc. can vary from these examples. Also the sequence of steps in the control logic can be altered; some steps can be omitted or added, etc.

We claim:

1. A method of controlling a powertrain, comprising:
   carrying air in a circuit from an engine inlet, through a channel to a clutch housing, to an intake manifold;
   controlling one of airflow into the circuit between the inlet and intake manifold and airflow in the circuit, using a diverter that increases airflow to the housing provided clutch temperature exceeds a reference, and decreases airflow to the housing provided a second reference exceeds desired engine airflow.

2. The method of claim 1, further comprising:
   using the diverter to increase airflow to the housing provided one of accelerator pedal displacement and engine intake manifold air pressure is greater than a reference displacement or pressure, respectively.

3. The method of claim 2, further comprising using the diverter to increase airflow to the housing provided engine knock exceed a reference engine knock.

4. The method of claim 1, further comprising:
   using the diverter to increase airflow to the housing provided an engine manifold intake air temperature is less than a reference engine intake air temperature.

5. The method of claim 1, further comprising using the diverter to increase airflow to the housing provided a powertrain temperature is less than a reference powertrain temperature.

6. A powertrain thermal management system, comprising:
an engine inlet;
a circuit carrying air in series among the engine inlet, a channel to a clutch housing and an intake manifold;
a diverter valve configured to control one of airflow into the circuit between the inlet and intake manifold, and airflow in the circuit, such that airflow increases to the housing provided clutch temperature exceeds a reference, and airflow decreases to the housing provided a second reference exceeds a desired engine airflow.

7. The system of claim 6, further comprising:
an intermediate passage between the engine inlet and intake manifold;
wherein the diverter valve is positioned within the intermediate passage.

8. The system of claim 7, wherein the diverter valve is configured to guide more air through the transmission housing when the diverter valve is closed.

9. A powertrain thermal management system, comprising:
an engine inlet;
a circuit for carrying air from the engine inlet, through a channel to a clutch housing, to an intake manifold;
a valve for controlling airflow to the intake manifold; and
a diverter that increases airflow to the housing provided clutch temperature exceeds a reference, and decreases airflow to the housing provided a second reference exceeds desired engine airflow.

10. The system of claim 9, wherein the flow regulator is a diverter valve.

11. The system of claim 9, wherein the flow regulator is an orifice.

12. The system if claim 9, further comprising:
a powertrain control unit configured to control the flow regulator according to a predetermined condition.

13. A control circuit for a powertrain thermal management system, comprising:
an engine inlet;
a circuit for carrying air from the inlet, through a channel to a clutch housing, to an intake manifold;
a transmission clutch temperature sensor;
an engine manifold air temperature sensor;
a diverter that increases airflow to the housing provided clutch temperature exceeds a reference, and decreases airflow to the housing provided a second reference exceeds desired engine airflow;
a powertrain control unit communicating with the sensors configured to control the diverter according to a predetermined condition.

14. The control circuit of claim 13, further comprising:
an engine intake manifold pressure sensor;
wherein the predetermined condition is an intake manifold pressure threshold.

15. The control circuit of claim 13, further comprising:
an accelerator pedal position sensor;
wherein the predetermined condition is meeting an accelerator pedal position threshold.

16. The control circuit of claim 13, further comprising:
an engine knock sensor;
wherein the predetermined condition is meeting an engine knock threshold or a spark retard threshold.

17. The control circuit of claim 13, wherein the predetermined condition is meeting an engine airflow threshold.

* * * * *